United States Patent [19]

Mojonnier

[11] Patent Number: 4,659,345
[45] Date of Patent: Apr. 21, 1987

[54] SCRUBBER/DEGASSER APPARATUS

[76] Inventor: Harry G. Mojonnier, 1238 Franklin Ave., River Forest, Ill. 60305

[21] Appl. No.: 883,930

[22] Filed: Jul. 10, 1986

Related U.S. Application Data

[63] Continuation-in-part of Ser. No. 654,304, Sep. 24, 1984.

[51] Int. Cl.[4] .............................................. B01D 53/14
[52] U.S. Cl. ....................................... 55/165; 55/226; 55/227; 261/110; 261/113
[58] Field of Search .................................. 55/164–167, 55/226, 227, 229, 196, 223, 225; 261/113, 110, 66

[56] References Cited

U.S. PATENT DOCUMENTS

| | | | |
|---|---|---|---|
| 1,776,019 | 9/1930 | Elliott | 55/165 |
| 2,671,524 | 3/1954 | Gilwood | 55/165 X |
| 3,272,020 | 9/1966 | Witt et al. | 74/18.1 |
| 3,286,764 | 11/1966 | Mojonnier et al. | 159/44 |
| 3,359,074 | 12/1967 | Dobo | 261/113 |
| 3,574,987 | 4/1971 | Skoli et al. | 55/193 |
| 3,584,438 | 6/1971 | Skoli et al. | 55/193 |
| 3,741,552 | 6/1973 | Skoli et al. | 261/140 |
| 3,884,651 | 5/1975 | Velegol | 55/223 |
| 3,985,625 | 10/1976 | Bjerg | 261/113 X |
| 4,112,828 | 9/1978 | Mojonnier et al. | 99/275 |
| 4,216,711 | 8/1980 | Skoli et al. | 99/277.2 |
| 4,265,167 | 5/1981 | Mojonnier et al. | 55/166 X |
| 4,350,503 | 9/1982 | Skoli et al. | 55/165 |
| 4,352,682 | 10/1982 | Kemp et al. | 55/165 |
| 4,358,296 | 11/1982 | Notardonato et al. | 55/38 |

Primary Examiner—Charles Hart
Attorney, Agent, or Firm—Trexler, Bushnell & Wolters, Ltd.

[57] ABSTRACT

A scrubbing/degassing apparatus comprises a degassing column for removing extraneous gaseous matter from water; and a flow control arrangement for controlling a flow of water to the degassing column. The flow control arrangement comprises an upper reservoir mounted above the degassing column for receiving a supply of water, a controllable valve responsive to predetermined control signals for regulating the flow of water to the upper reservoir, a level sensor operatively coupled with the upper reservoir and responsive to the level of water therein for producing said predetermined control signals in a predetermined systematic fashion in accordance with this level, and structure defining an adjustable orifice of selectively variable size intermediate the upper reservoir and the column for delivering water from the upper reservoir to the column; the rate of flow of water from the upper reservoir to the column being controlled by the level of water in the upper reservoir set by the level sensor together with the selected size of the adjustable orifice.

16 Claims, 9 Drawing Figures

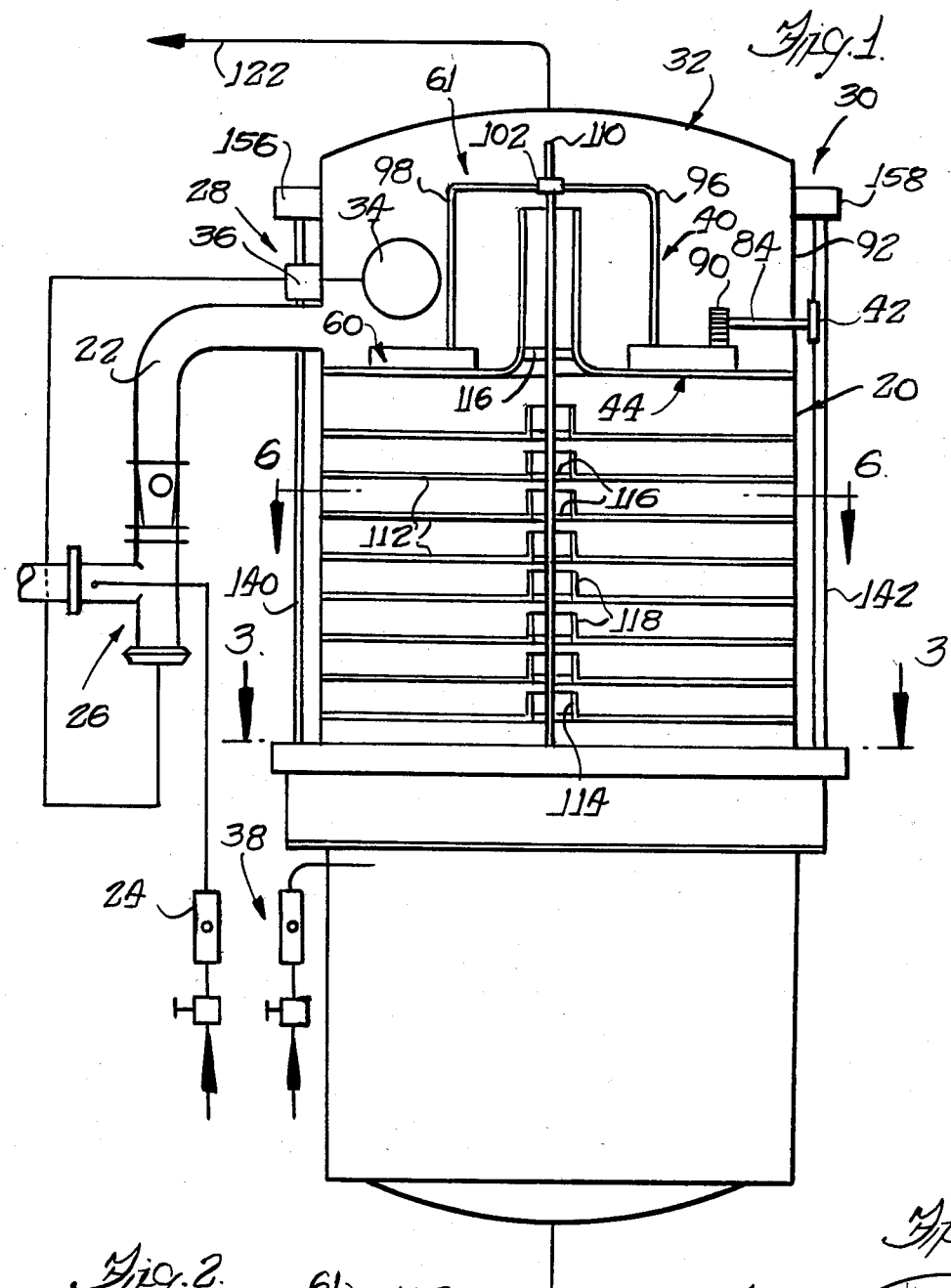
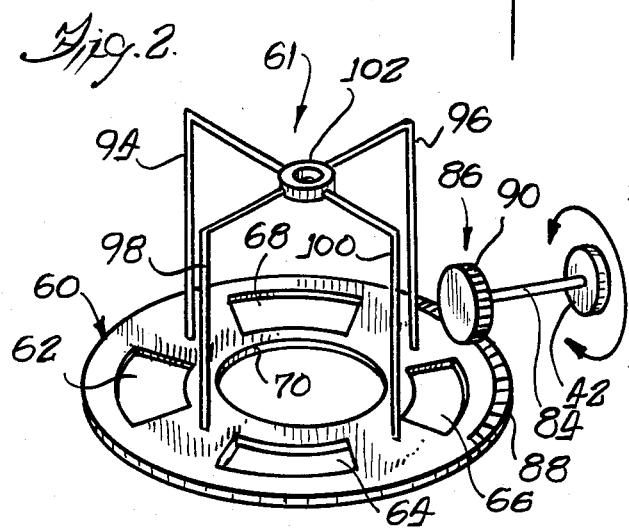
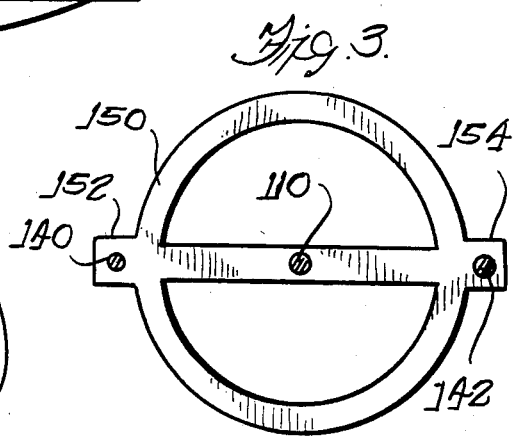

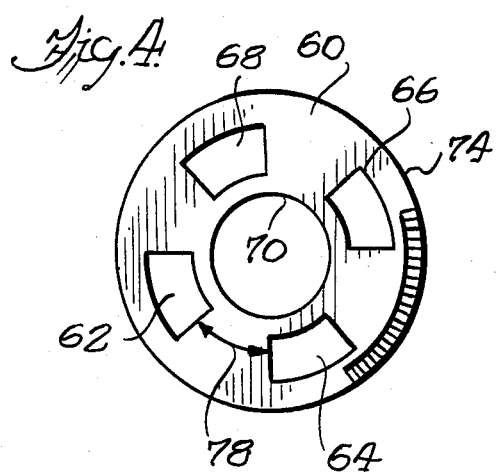
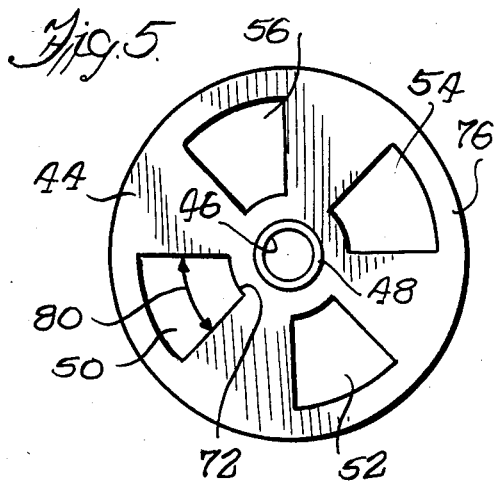
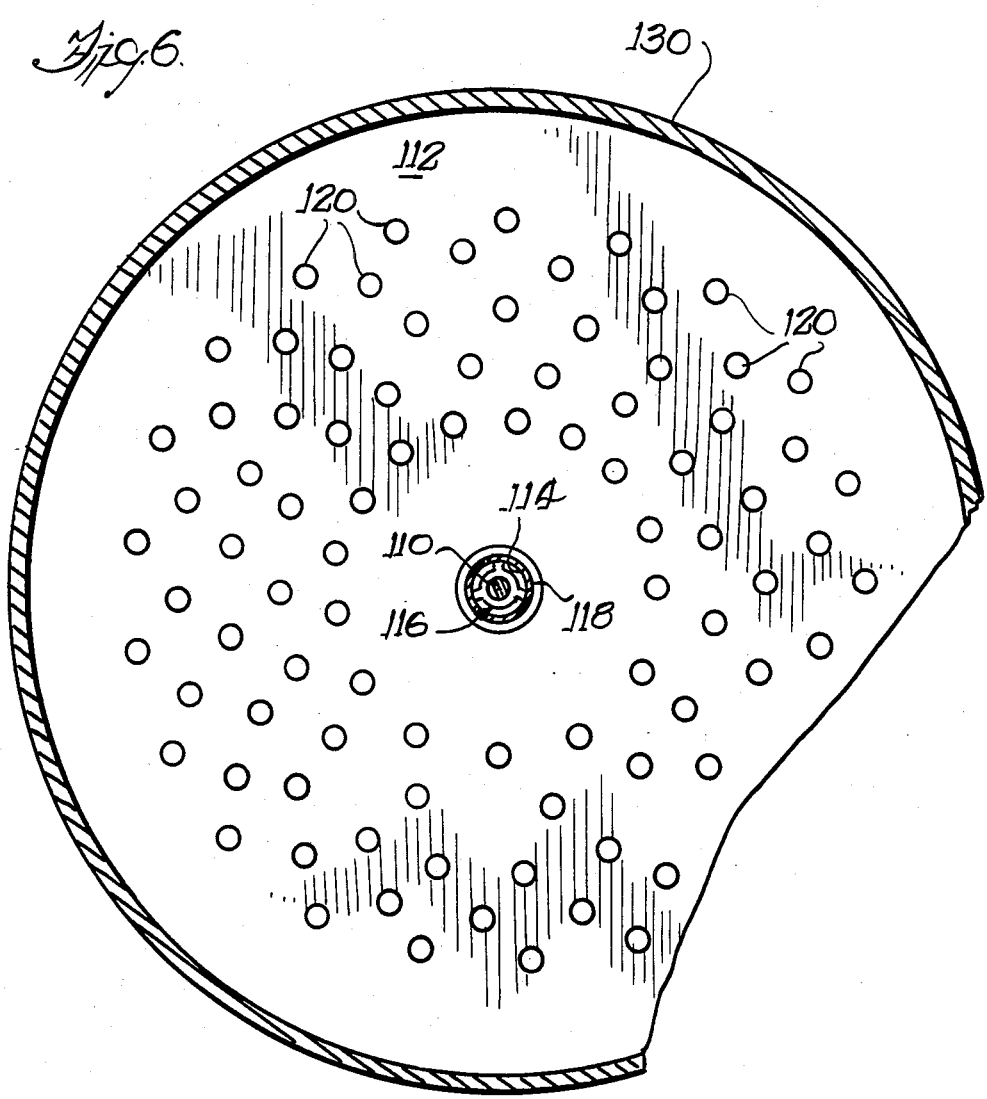

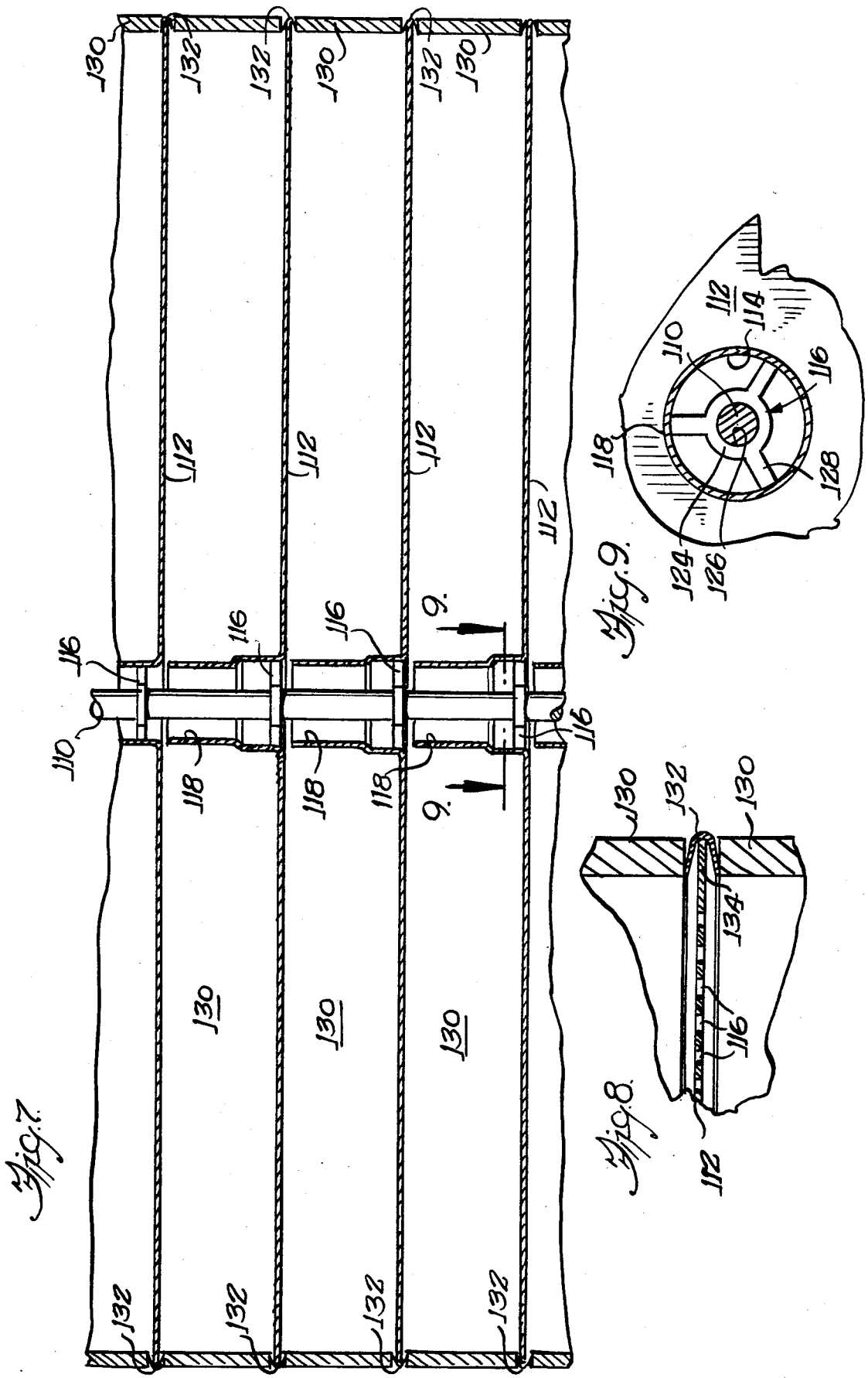

SCRUBBER/DEGASSER APPARATUS

CROSS-REFERENCE TO RELATED APPLICATION

This application is a continuation-in-part of my earlier application, Ser. No. 654,304, filed Sept. 24, 1984.

BACKGROUND OF THE INVENTION

This invention relates generally to apparatus for removing extraneous gaseous matter from water, and more particularly to a novel and improved scrubber/degasser apparatus for removing extraneous gaseous matter from water used as ingredient water in beverage production.

While the scrubber/degasser apparatus of the invention may be useful in other applications, description of the invention will be facilitated by specific reference to the problem of removal of extraneous gaseous matter (primarily air and oxygen) from water used in beverage production and processing. In the beverage industry, it is often desirable to remove extraneous gaseous matter from the water to promote increased stability of the beverage during mixing or proportioning thereof and especially during the filling process, as well as during storage prior to consumption. In particular, in the filling process, extraneous air and/or oxygen in the beverage cause excessive "foaming" in some beverage products. Such foaming makes accurate, high-speed filling of individual containers difficult or impossible.

Moreover, the presence of excess air and/or oxygen in the beverage can cause premature deterioration and instability of the beverage following filling or packaging thereof. Such premature deterioration and instability greatly decreases the shelf life of the packaged product. This is particularly true of fruit juice products which are generally produced from a juice concentrate which is reconstituted by dilution to the desired concentration with water.

In the prior art, the problems of foaming and stability were addressed by controlling the pressure of the product during preparation and filling and also by cooling the product to maintain such pressure control and to promote beverage stability. However, modern containers and high-speed filling apparatus permit and in fact require higher pressures to be utilized to increase filling line efficiency. Moreover, cooling equipment is relatively expensive and energy-intensive. That is, cooling equipment is relatively expensive to produce, install and maintain, and is also expensive to operate due to its relatively high energy consumption characteristics. Hence, cooling in high-speed beverage production is not only relatively cumbersome and expensive but may also fail to achieve the desired stability of the beverage during filling in some instances.

My above-referenced co-pending application describes a novel and advantageous scrubbing apparatus for removing extraneous gaseous matter, and particularly air and oxygen, from ingredient water used in beverage production. This application is directed to improvements upon the apparatus disclosed in my aforesaid co-pending application.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

FIG. 1 is an elevational view, partially broken away and somewhat diagrammatic in form, illustrating an improved scrubber/degasser apparatus in accordance with the invention;

FIG. 2 is an enlarged perspective view illustrating a portion of a novel adjustable orifice feature of the apparatus of FIG. 1;

FIG. 3 is a sectional view taken generally in the plane of the line 3—3 of FIG. 1;

FIGS. 4 and 5 are top plan views of respective cooperating members or portions of an adjustable orifice feature of the apparatus of FIG. 1;

FIG. 6 is an enlarged sectional view taken generally in the plane of the line 6—6 of FIG. 1;

FIG. 7 is an enlarged partial sectional view illustrating further features of the apparatus of FIG. 1;

FIG. 8 is a further enlarged partial sectional view of a portion of FIG. 7, illustrating further details thereof; and FIG. 9 is a further enlarged partial sectional view taken generally in the plane of the line 9—9 of FIG. 7.

DETAILED DESCRIPTION OF THE ILLUSTRATED EMBODIMENT

Referring now to the drawings and initially to FIG. 1, there is shown a novel scrubbing/degassing apparatus in accordance with the invention. This apparatus includes a degassing column, here designated generally by the reference numeral 20, for removing extraneous gaseous matter from water, and a flow control arrangement or means, here designated generally by reference numeral 30, for controlling the flow of water to the degassing column 20. The flow control means or structure 30 includes an upper reservoir 32 mounted above the degassing column 20 for receiving a supply of water by way of an inlet conduit 22. In the preferred embodiment illustrated herein, scrubbing of the water is done by a countercurrent of a scrubbing gas such as carbon dioxide (or nitrogen if preferred) introduced by way of a valve 24 to inlet conduit 22. Further removal of extraneous gaseous water from water is carried out in the column 20, as will be more fully explained later, by trickling water downwardly through the column which is maintained in a vacuum or negative pressure state.

Hence, the former operation is referred to herein as "scrubbing" while the latter operation is referred to as "degassing". Both of these operations cooperate to remove a substantial portion of extraneous gaseous matter, and primarily air and oxygen, from water to be used as ingredient water in a beverage production system.

In accordance with the invention, the flow control assembly 30 further includes a controllable valve or valve means 26, responsive to predetermined control signals for regulating the flow of water through the inlet conduit 24 and hence to the upper reservoir 32. Moreover, level sensing means or apparatus 28 is provided operatively coupled with the upper reservoir and responsive to the level of water therein for producing the necessary control signals for control of the valve 26 in a predetermined systematic fashion in accordance with the level of water in upper reservoir 32. Preferably, the level sensing means or apparatus includes a float or float means 34 in the reservoir 32 and a signalling apparatus or means 36 operatively coupled with the float 34 so as to produce signals corresponding to the level thereof and hence to the level of water in the reservoir 32. The valve 26 is responsive to these signals from the signal producing apparatus 36 for controlling the flow of water to the upper reservoir 32 as a function of the level of the float 34. In the preferred embodiment illustrated herein, the valve 26 is a pneumatic or air-controlled valve and the float 34 and control unit 36 are part of a pilot air float valve arrangement, both generally of the type set forth in U.S. Pat. No. 3,260,504. However, other arrangements may be used without departing from the invention.

Further in accordance with the invention, the flow control assembly 30 includes a further means or sub-assembly designated generally by reference numeral 40 defining an adjustable orifice of selectably variable size between the upper reservoir 32 and the degassing column 20 for delivering water from the upper reservoir to the column. Hence, the rate of flow of water from upper reservoir 32 to the column 20 is controlled generally by the level of water in the upper reservoir set by the level sensing means or arrangement 28 together with the selected size of adjustable orifice means or sub-assembly 40.

The means 40 defining the adjustable orifice preferably include an adjustment means or member, which here takes the form of a knob 42 extending externally of the scrubbing apparatus for selecting the selectable variable size of this orifice. In this regard, the upper reservoir 32 includes a bottom wall portion 44 located immediately over or above the column 20 and having at least one through opening therein. Referring also to FIG. 5, the bottom wall 44 will be seen to include a central through opening 46 which is defined by a generally vertically upwardly extending lip or stack member 48. However, the at least one through opening referred to above comprises a plurality of openings 50, 52, 54 and 56 whose effective size may be adjusted in a manner to be described presently, to define the effective overall size of the orifice or opening between the reservoir and column to accommodate the flow of water from the former to the latter.

Cooperating with the through openings 50, 52 etc. to define the effective orifice size, is a cover member 60, also illustrated in FIGS. 2 and 4, which has overall dimensions at least as large as the through openings in order to completely cover or close off the same when desired. Means are provided for mounting this cover for generally slideable movement relative to the bottom wall 44 through a substantially continuous range of positions for either partially or fully obstructing the openings 50, 52 etc. to thereby define the selectable effective orifice size. This mounting means is referred to generally by reference numeral 61 in FIG. 2.

In the preferred embodiment illustrated herein, the reservoir 32 and column 20 are generally cylindrical in configuration, and hence bottom wall 44 is circular in form. The apertures 50, 52, 54 and 56 are preferably arranged in a generally arcuate fashion about the center of bottom wall 44 so as to define generally angularly or arcuately spaced segments of an annulus. Cooperatively, the cover member is a substantially circular, plate-like member having a similar plurality of through apertures 62, 64, 68 and 70 arranged generally about its center to define similarly angularly spaced segments of a similar annulus to that defined by the aforementioned apertures of the bottom wall 44. However, in the illustrated embodiment, the apertures 62, 64, etc. of the cover member 60 are somewhat of lesser radial extent than those of the bottom wall 44.

Moreover, the cover member 60 is generally annular in form having an enlarged through opening 70 sized to fit without interference over the central stack 48 of the bottom wall 44. However, the diameter 70 is no greater than the minimum or inner diameter 72 defined by apertures 50, 52, etc. In the same fashion the outer diameter 74 of plate or cover member 60 is preferably at least as great as the maximum or outer diameter 76 defined by through apertures 50, 52, etc. Moreover, the angular spacing between apertures 62, 64, etc. as indicated generally by reference numeral 78, is preferably at least as great as the angular extent, as indicated by reference numeral 80, of the respective through apertures 50, 52, etc. Hence, it will be seen that as the cover 60 is rotated relative to bottom wall 44, the respective apertures therein may be brought into and out of registry with apertures 50, 52, etc. Hence, at one extreme the apertures 50, 52, etc. are completely blocked or shut off by the solid portions of cover 60. At the opposite extreme, with the respective apertures fully in registry, a maximum orifice size is defined generally by the size of the somewhat smaller apertures 62, 64, etc. of the cover member 60. It will be recognized that other arrangements of the respective through apertures in the bottom wall 44 and cover member 60 may be utilized without departing from the invention, so long as some controllably variable effective size of opening for the flow of water between reservoir 32 and column 40 is provided.

Referring now also to FIG. 2, the means for adjusting the size of the orifice, in addition to the adjustment member or knob 42, include an elongate shaft member 84 extending from this adjustment knob 42 and means 86 operatively coupling shaft 84 for slideably moving the cover 60 relative to bottom wall 44. In the embodiment illustrated, this latter means or structure 86 comprises a generally arcuate rack 88 coupled with or otherwise formed on the cover 60 and a complementary gear or sprocket member 90 in engagement with the rack 88. The gear or sprocket may be bi-directionally rotated so as to rotate the cover 60 through the predetermined angular range of movement relative to the bottom wall 44, as described above, for achieving control of the effective orifice size. Hence, the shaft 84 is fixed to a sidewall 92 of the upper reservoir 32, thus fixing the position of gear 90 relative to rack 88.

Moreover, as previously mentioned, the cover 60 is rotatably mounted by mounting means or assembly 61, so that rotation of stationary gear 90 achieves the desired bi-directional rotational movement of rack 88 and hence of cover 60. More particularly, and as best viewed in FIGS. 1 and 2, the mounting arrangement 61 comprises a cage-like member defined by a plurality of legs 94, 96, 98 and 100. These legs are respectively coupled with the cover member 60 and extend upwardly therefrom and radially inwardly. A central bearing member 102 engages the inwardly extending portions of the legs 94, 96, etc. and in turn has a through bore or aperture rotatably mounted to an elongate, generally vertically mounted centering or alignment rod 110 which will be more fully described presently.

Referring now also to remaining drawing FIGS. 3 and 6 through 9, the column 20 comprises a plurality of generally similar and preferably identical foraminous sheets 112 mounted in vertical array. As previously mentioned, the column 20 is preferably generally cylindrical in form, and hence respective sheets 112 are of generally circular form defining outer peripheries of like diameter, which preferably are respectively aligned or in registry. Moreover, each of the sheets 112 includes at least one enlarged through aperture 114 which is preferably centrally located thereon and generally coaxial with the outer diameter or periphery thereof.

The alignment or centering rod 110 mentioned above extends through these aligned through apertures 114, and is provided with additional coupling means or strut means 116 for coupling the same respectively to the foraminous sheets, and preferably to radially inner surfaces of the through apertures 114 therein. Hence, the centering or alignment rod 110 serves to hold all of the sheets in a desired generally coaxial alignment relative to an axis defined by rod 110.

In the illustrated embodiment, the foraminous sheets 112 preferably include raised lip portions 118. Preferably these lips have extended vertical walls, as best seen in FIG. 7, to define stacks, similar to, but of somewhat lesser vertical extent than, stack 48 discussed above. Moreover, these stacks or through apertures defined by these lips will be seen to be generally in coaxial alignment with the stack 48 and through aperture 46 defined therethrough. A similar, additional mounting or centering strut member 116 may also be provided intermediate rod 110 and stack 48 for similar centering purposes. These raised lips or stacks serve to prevent the flow of water through the enlarged through apertures, and confine the flow to the relatively smaller foramines 120 (see FIG. 6) in the respective sheets 112. However, escaping extraneous gases may travel upwardly through these respective aligned stacks or through apertures to exit a top portion of the column as generally indicated by arrow 122.

As best viewed in FIG. 9, each of the struts 116 includes a central body or bearing portion 124 defining a through bore 126 for engagement about the centering or aligning rod 110 and a plurality of similar arms 128 which extend generally radially outwardly of the bearing or body 124 to engage interior surfaces of the raised lip portions or stacks 118 of each of the sheets 112. The struts are preferably spaced by substantially equal, axial amounts along the rod 110, as illustrated in FIG. 1, so as to generally hold the foraminous sheets in similarly axially spaced condition therealong.

The outer walls of the column 20 are defined by a plurality of generally tubular wall segments or portions 130 of similar peripheral dimensions to the foraminous sheets 112. As previously mentioned, the column 20 and hence the wall segments or portions 130 forming the outer walls of the same are of generally cylindrical shape. These wall segments or portions 130 are disposed intermediate and separating each sheet 112 from the next adjacent sheet, such that the respective peripheries of the walls and sheets are aligned and vertically stacked to define the degassing column. Moreover, gasket means 132 are respectively disposed intermediate the respective wall portions or segments 130 and foraminous sheets 112 for sealingly engaging peripheral edges of each sheet 112 between the facing edges of the respective wall segments or portions 130 to either side thereof.

It will be remembered that the foraminous sheets are preferably substantially circular in peripheral configuration, and hence the gaskets 132 are generally annular members, each having an outer diameter similar to that of the foraminous sheets 112. Moreover, as best seen in FIG. 8, each of the gaskets 132 has a generally U-shaped cross-sectional configuration opening radially inwardly for receiving and sealingly engaging a peripheral edge portion 134 of a sheet 112 therewithin. This engagement is such that an axial edge of a wall portion or segment 130 to either side of each gasket 132 presses the same respectively against the oppositely facing peripheral surface portions of the edge 134 of the sheet 112 to achieve sealing engagement therebetween.

Cooperatively, the preferred operation of the column in an evacuated condition, that is, under a negative pressure further enhances compressive forces experienced therewithin for holding the wall portions 130 in the desired sealing engagement with the respective gaskets 132 and sheets 112. The evacuation may be accomplished by suitable vacuum-creating means (not shown) coupled with outlet 122.

However, to maintain the desired sealed condition of the column in the absence of a vacuum or negative pressure therein (i.e., while the column is not in operation), a plurality of external tie rods 140, 142 (see FIG. 1) may also be provided. While two such tie rods are shown in the illustrated embodiment, it is to be understood that additional tie rods may be utilized without departing from the invention. Preferably, the column includes a bottom frame member or portion 150 shown in FIG. 3, which has radially outwardly projecting support members 152, 154 for receiving and retaining one end of each of tie rods. Similar support for the tie rods 140, 142 is provided at the top portion of the column 20, and specifically at an upper portion of reservoir 30 by similarly outwardly projecting members 156 and 158 which may be rigidly coupled to sidewall 92 of upper reservoir 32. Hence, these respective support members receive and engage the tie rods at spaced locations about the outer periphery of the column 20.

While particular embodiments of the invention have been shown and described, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A scrubbing/degassing apparatus comprising: a degassing column for removing extraneous gaseous matter from water; and flow control means for controlling a flow of water to said degassing column, said flow control means comprising an upper reservoir mounted above said degassing column for receiving a supply of water, controllable valve means responsive to predetermined control signals for regulating the flow of water to said upper reservoir, level sensing means operatively coupled with said upper reservoir and responsive to the level of water therein for producing said predetermined control signals in a predetermined systematic fashion in accordance with said level, and means defining an adjustable orifice of selectively variable size intermediate the upper reservoir and the column for delivering water from the upper reservoir to the column; the rate of flow of water from said upper reservoir to said column being controlled by the level of water in the upper reservoir set by said level sensing means together with the selected size of the adjustable orifice.

2. Apparatus according to claim 1 wherein said degassing column comprises a plurality of foraminous sheets mounted in vertical array, each said sheet including at least one enlarged through aperture, the enlarged through apertures of all of the sheets in said vertical array being aligned; and further including an elongate aligning rod extending through said aligned enlarged through apertures, and coupling means for rigidly connecting each said foraminous sheet to said aligning rod to hold all of the sheets in generally coaxial alignment relative to an axis defined by said alignment rod.

3. Apparatus according to claim 2 wherein said coupling means comprises a plurality of strut means, each having a central body portion defining a through bore for close engagement about said rod and a plurality of arms extending radially outwardly of said body for engagement with the enlarged through aperture of one of said foraminous sheets.

4. Apparatus according to claim 3 wherein said strut means are axially spaced by substantially equal, predetermined amounts along said aligning rod to thereby hold said foraminous sheets in similarly axially spaced condition therealong, and wherein said foraminous sheets comprise substantially flat, circular sheets, said enlarged through apertures being circular and substantially centered thereupon.

5. Apparatus according to claim 2 and further including a plurality of generally tubular wall portions of peripheral dimensions similar to those of said foraminous sheets and disposed intermediate and separating each sheet from the next adjacent sheet, with the respective peripheries of all of said sheets and of said wall portions being aligned and vertically stacked to define said degassing column, and gasket means disposed intermediate respective facing edges of each of said wall portions for sealingly engaging peripheral edges of one of said sheets therebetween, said wall segments holding the foraminous sheets in the desired axially spaced condition and the alignment rod holding the same in the desired coaxially aligned condition for collectively defining the degassing column.

6. Apparatus according to claim 5 wherein said foraminous sheets are substantially circular in peripheral configuration and wherein each said gasket means comprises a generally annular member having an outer diameter similar to that of said foraminous sheet and defining a generally U-shaped cross-sectional configuration opening radially inwardly for receiving and sealingly engaging a peripheral edge portion of said sheet therewithin, such that an axial edge of a wall portion to either side of said gasket presses the same respectively against the oppositely facing peripheral surface portions of said sheet to achieve said sealing engagement therebetween.

7. Apparatus according to claim 5 and further including means for producing a vacuum in said column for removing said extraneous gaseous matter from said water flowing therethrough and for further enhancing compressive forces for holding said wall portions in said sealing engagement with the respective foraminous sheets.

8. Apparatus according to claim 5 and further including a plurality of tie rods for facilitating the maintenance of said column in a generally axially compressed, sealed condition in the absence of a vacuum produced therein during operation, said column further including respective top and bottom support members having radially outwardly projecting and axially aligned support members for receiving and engaging said tie rods at spaced locations about the outer periphery of said column.

9. Apparatus according to claim 2 wherein said upper reservoir includes a bottom wall portion located immediately above said column and wherein said means defining said adjustable orifice includes adjustment means extending externally of said scrubbing apparatus for selecting said selectable variable size thereof, at least one through opening in said bottom wall portion, a cover member of dimensions at least as large as said through opening, and mounting means for mounting said cover member for slidable movement relative to said bottom wall through a substantially continuous range of positions for partially or fully obstructing said opening to thereby define a selectable effective size thereof.

10. Apparatus according to claim 9 wherein said adjustment means comprises a rotatable member located externally of said scrubbing apparatus and further including an elongate shaft extending from said rotatable member interiorly of said apparatus and means operatively coupling said shaft for slidably moving said cover member relative to said bottom wall portion to achieve said variable positioning thereof relative to said opening.

11. Apparatus according to claim 9 wherein said means defining said adjustable orifice comprises a plurality of through openings in said bottom wall arranged in a generally arcuate fashion about a center thereof so as to define generally angularly spaced segments of an annulus, said cover member comprising a plate-like member having a plurality of through apertures arranged about a center thereof so as to define similarly spaced segments of a similar annulus, and wherein said mounting means comprises means rotatably mounting said cover member coaxially with said bottom wall for a predetermined range of rotatable movement relative thereto for locating the respective apertures in registry or out of registry by selectable angular extents to define the effective size thereof.

12. Apparatus according to claim 11 and wherein said external adjustment means comprises a rotatable member, and further including generally arcuate rack means coupled with said cover member and gear means in engagement with said rack means for rotating said cover through said predetermined range of movement, and shaft means coupling said rotatable member with said gear means for rotating the same to achieve corresponding rotation of said cover member.

13. Apparatus according to claim 11 wherein said bottom wall is provided with an enlarged through aperture in coaxial alignment with the enlarged through apertures of said foraminous sheets therebelow, wherein said cover member has a similar coaxially aligned enlarged through aperture, and wherein said elongate rod member extends upwardly through said apertures and into said reservoir, and further including a strut member for aligning said rod relative to said bottom wall, and means rotatably mounting said cover member to said alignment rod.

14. Apparatus according to claim 13 wherein said means rotatably mounting said cover member comprises a cage-like member having a plurality of legs coupled with said cover member radially outwardly of said enlarged through aperture therein and extending upwardly and inwardly, and a bearing member rotatably mounted to said alignment rod and coupled to said legs of said cage-like member.

15. Apparatus according to claim 1 wherein said level sensing means comprises float means in said upper reservoir and signalling means coupled to said float means for producing signals corresponding to the level thereof and comprising said predetermined control signals, and wherein said controllable valve means is responsive to said signals for controlling the flow of water to said upper reservoir as a function of the level of said float means.

16. Apparatus according to claim 2 wherein each of said foraminous sheets further includes a raised lip portion about said enlarged through aperture therein to substantially prevent flow of water through said enlarged through aperture and permit upward escape of extraneous gaseous matter from the water therethrough, thereby confining the flow of water substantially to the foramines of said foraminous sheets.

* * * * *